Aug. 27, 1940.                C. PFILE                2,213,019
              CONTROL ATTACHMENT FOR FISHING LURES
                       Filed Feb. 7, 1938
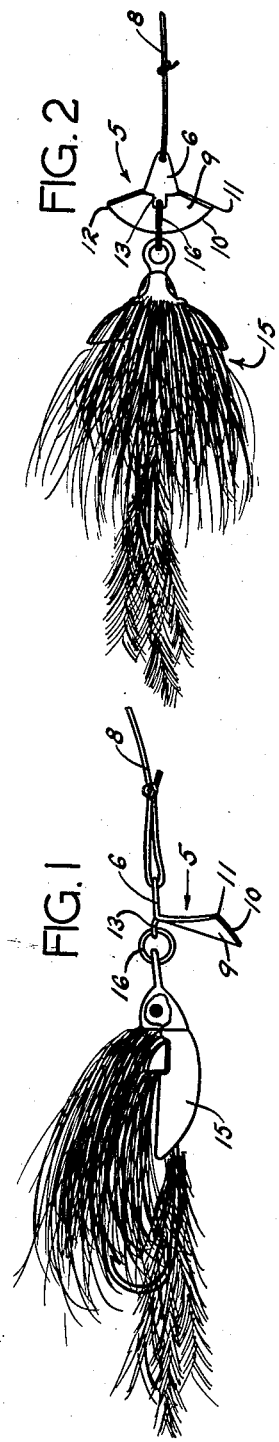
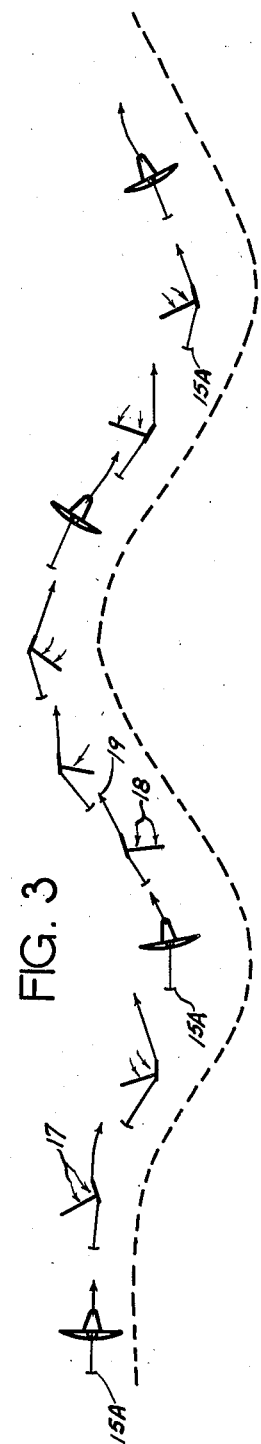
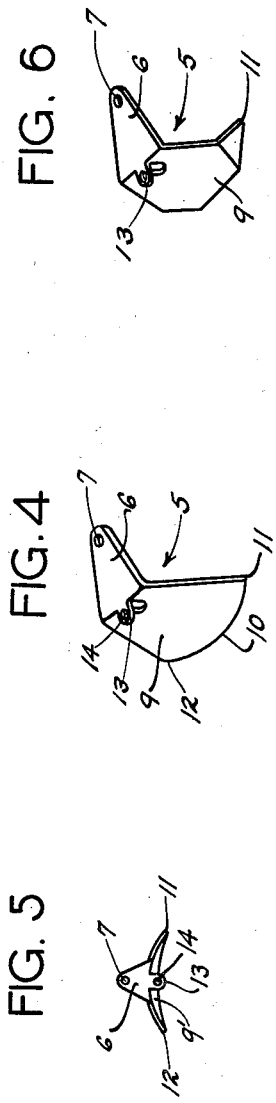
CHARLES PFILE
INVENTOR Patented Aug. 27, 1940

2,213,019

UNITED STATES PATENT OFFICE 2,213,019

CONTROL ATTACHMENT FOR FISHING LURES

Charles Pfile, Oklahoma City, Okla.

Application February 7, 1938, Serial No. 189,132

4 Claims. (Cl. 43—42)

The invention relates to fishing lures and more particularly to a control attachment for imparting a life like movement to such lures as they are drawn through the water.

Plates attached rigidly to the forward end of lures are well known. They serve to cause the lure to dive below the surface of the water. When pulled through the water swiftly the lure dives to a greater depth than when it is pulled through the water slowly. The diving action is supposed to be a life like action, which in turn is presumed to attract the fish. Also spinners are well known. They are used on lighter lures and their spinning motion at the forward end of the lure is also supposed to attract the fish. It is well known, however, that no live fish actually travels through the water by continually rising to the surface and diving below the surface, so that neither the diving lure or the spinner equipped lure actually accomplishes the desired result, i. e. that of fooling the fish into striking the lure. To actually accomplish this result, it is necessary to impart a life like movement to the lure as it travels through the water. A life like movement is a zig-zag movement as every fisherman well knows, and as every other person knows who has carefully observed a swimming fish.

The chief object of my invention, therefore, is to provide an easily detachable control attachment for fishing lures which, when drawn through the water, will actually impart a zig-zag, life like motion to the lure.

The details in the construction of a preferred form of my invention, together with other objects attending its production, will be better understood from the following description when read in connection with the accompanying drawing, which are chosen for illustrative purposes only, and in which Figure 1 is a side elevation of the attachment and shows it in its proper relation to a lure and to a leader line;

Figure 2 is a view similar to Figure 1, but is a plan elevation;

Figure 3 is a diagrammatic view illustrating the action of the attachment, as well as the resulting movement of the lure, as both are drawn through the water;

Figure 4 is a perspective view of the attachment, showing the details of construction; and Figures 5 and 6 are perspective views showing slightly different embodiments of my invention.

Like characters of reference denote like parts throughout the several figures.

The control attachment, as a whole, is designated by the numeral 5. It comprises a surface plate 6, provided with a perforation 7 at its forword end, which affords connection of a leader line 8 to the device. This plate 6 may be substantially triangular in shape, as shown, or its sides may be parallel. Integral with the rear end of the plate 6, and extending at an angle therefrom is a flared forwardly facing concavo-convex apron 9. This apron is preferably arcuate in cross section, and is wider at its lower end than at its upper end, where it connects with the plate 6. The lower edge 10 of the apron 9 is also preferably in the form of an arc, as illustrated. If preferred, however, the apron 9 may be in the form of a plane surface, with its outer corners 11 and 12 bent forward, as shown in Fig. 6. I have determined by experiment that these two forms have almost the same action in water.

Extending from the rear of the plate 6, and lying substantially in the same plane, is a perforated extension 13, the perforation 14 of which serves as a means of connecting a lure 15 to the rear end of the attachment, preferably by means of a split metal ring 16.

Referring to Figure 3, which is a plan elevation diagram clearly illustrating the action and operation of the device as it is drawn through the water, and type lure is represented by the tiny anchor at the rear end of each figure, which is designated by the numeral 15a. Proceeding from the left of Figure 3 toward the right, the attachment is first shown in normal or neutral position. Next, as it proceeds through the water in the general direction indicated by the arrows at the forward end of each diagram, the apron 9 is illustrated as having turned out to one side of the horizontal axis, and the resistance of the water against forward movement of the device is indicated by the arrows 17. Due to the continued forward movement, however, the water resistance succeeds only in slightly changing the course of the forward travel, and the device moves into the position shown in the third diagram. With forward movement, the water resistance against the inside surface of the apron 9 causes the entire device to reversely turn itself passing through the neutral position (4th diagram) and immediately into the position shown in the 5th diagram with the apron 9 on the opposite side of the horizontal axis. In this position the direction of the water resistance is indicated by the arrows 18. This resistance forces the device to again change its course and to travel in the general direction indicated by the arrowhead 19. The device then respectively moves into the positions shown by the 6th, 7th, and 8th diagrams, at which point the device has substantially finished one complete cycle of movement. These movements and cycles of movement are repeated so long as the device is drawn through the water, and cause the lure 15a, which is attached to the device, to travel in a path similar to that illustrated by the dotted line in Figure 3. If the travel through the water is swift, then the device passes through a complete cycle of movement quickly, and the lure zig-zags fast. If the travel is slow, then the zig-zag movement is also comparatively slow. Also by slightly bending the apron 9 to change the angle between it and the plate 6, various speeds of movement can be obtained, and various degrees of zig-zag.

It has previously been stated that the two embodiments shown in Figures 4 and 6 have almost the same action in the water. A different embodiment than either of these is shown in Figure 5. This form includes a rearwardly facing concavo-convex apron 9', and I prefer this form for use with extremely light weight lures, such as artificial flies, etc. The fact that the outside edges face to the rear permit the device to pass through the water more easily, yet the fact that the outside edges are at an angle to each other prevent the device from turning completely over in the water, as would be the case if the apron 9 was made in the form of a plane surface. The less the relative angle between the two side edges of the apron, the less tendency there will be for the device to turn completely over in the water and cause the lure to do likewise. By varying this angle the device may easily be adapted for use with any weight lure.

While I have described and illustrated only three embodiments of my invention, I am aware that numerous alterations and changes may be made therein without transcending the inventive idea, and I do not wish to be limited except by the prior art and by the scope of the appended claims.

I claim:

1. A control attachment for a fishing lure comprising: a surface plate including perforations for loosely attaching its forward end to a fishing line and its rear end to a fishing lure; and a concavo-convex apron integral with and extending at an angle from said surface plate, and adapted to be moved into various positions by water resistance and thus to force a lure connected thereto to travel a devious path through the water.

2. A control attachment for a fishing lure comprising: a surface plate including perforations for loosely attaching its forward end to a fishing line and its rear end to a lure; and an integral apron of concavo-convex form extending downward from the rear end of said plate and at an abrupt angle thereto, the concave portion of said apron facing in a rearward direction; said apron and its integral surface plate being adapted to be moved into various positions by water resistance, and thus to force a lure connected thereto to travel a devious path through the water.

3. As an article of manufacture, a control attachment for fishing lures comprising a surface plate including means for attaching its forward end to a fishing line and its rear end to a lure, and an angularly disposed apron rigidly attached to the rear end of the surface plate and adapted to resist free movement of the lure through the water and in so resisting to force said lure to travel a zigzag course through the water.

4. In a fish lure, the combination of a body provided with a hook, a control attachment for the forward end of the body, comprising a surface plate normally lying in a substantially horizontal plane and terminating at its rear end in an angularly disposed normally depending apron, and means for attaching the body to the rear end of the surface plate at substantially the line of juncture between the surface plate and the apron, and said means being adapted to permit free movement between the control attachment and the body, the surface plate at its forward end being formed to permit attachment thereto of a fishing line.

CHARLES PFILE.